「(12) United States Patent
Marshall

(10) Patent No.: US 6,714,694 B1
(45) Date of Patent: Mar. 30, 2004

(54) METHOD FOR SLIDING WINDOW IMAGE PROCESSING OF ASSOCIATIVE OPERATORS

(75) Inventor: Sidney W. Marshall, Penfield, NY (US)

(73) Assignee: Xerox Corporation, Stamford, CT (US)

(*) Notice: Subject to any disclaimer, the term of this patent is extended or adjusted under 35 U.S.C. 154(b) by 549 days.

(21) Appl. No.: 09/721,726

(22) Filed: Nov. 27, 2000

(51) Int. Cl.[7] .................................................. G06K 9/36
(52) U.S. Cl. ........................ 382/307; 382/282; 382/285
(58) Field of Search ................................. 382/103, 104, 382/105, 106, 108, 109, 112, 113, 149, 171, 190, 252, 266, 274, 282, 284, 286, 294, 307, 309; 358/516, 519, 520, 450, 453, 463; 345/779, 781, 782, 783, 784, 788, 790, 797

(56) References Cited

U.S. PATENT DOCUMENTS 4,640,620 A * 2/1987 Schmidt ...................... 356/609
4,768,214 A * 8/1988 Bjorkholm .................... 378/87
5,540,228 A * 7/1996 Li ................................ 600/443
5,689,340 A * 11/1997 Young ........................ 356/401
6,145,990 A * 11/2000 Uchida ........................ 351/221
6,229,549 B1 * 5/2001 Smith .......................... 345/419
6,473,517 B1 * 10/2002 Tyan et al. ................... 382/105

* cited by examiner

Primary Examiner—Timothy M. Johnson
Assistant Examiner—Yosef Kassa

(57) ABSTRACT

A method for implementing sliding-window image processing for associative operators such as MIN, MAX, AND, and OR is disclosed. For one dimension, the present method divides the image into blocks according to the sliding window size and for each block calculates two sets of partial results, one working from the left boundary of the block and the other working from the right boundary of the block. The partial results from two adjacent blocks can then be combined in one operation to give a final value for any window straddling two adjacent blocks. The total number of operations is proportional to 3M; where M is the scan length as compared to (n−1)M using prior art; where n is the length of the sliding window. The present invention can be extended to two-dimensional arrays and can be extended to support arbitrary window sizes.

18 Claims, No Drawings

METHOD FOR SLIDING WINDOW IMAGE PROCESSING OF ASSOCIATIVE OPERATORS

FIELD OF THE INVENTION

This invention relates generally to the field of image processing and, more particularly, to the methods for implementing sliding-window digital image processing for associative operators such as MIN, MAX, AND, and OR.

BACKGROUND OF THE INVENTION

In the arts, there are instances in digital image processing systems, either in hardware or software, where one would like to calculate some property of the image in a sliding rectangular window. For example, knowing the average value of pixels in a region around a central pixel gives an indication that is useful for certain noise removal algorithms. As such, knowing the minimum and maximum value of a pixel in a window can be used to identify image regions that are "flat" or considered background.

In order to calculate an average for an interval along a scan line, one can add up the pixel values in the interval. To calculate the sum of the pixel values in an interval that is displaced by one pixel, the value of the pixel leaving the interval can be subtracted and the pixel value of the one entering the interval can be added for a total of two operations required to calculate the sum of the new interval. For long intervals, this is much faster than recalculating the sum of all the pixels in the new interval. This works because the addition operation is associative, commutative, and has an inverse operation, namely subtraction. This technique can be expanded to incrementally calculate the sum of the pixels in a rectangle that is slightly displaced. All of these techniques have limitations to which the present invention is directed, namely, that in certain image processing algorithms one wants to calculate a minimum or maximum value of a sliding window of values and, since the min or max function does not have an inverse the above method is inapplicable. As such, if the length of the sliding window is n and the window is slid m times, then an obvious implementation will use on the order of m*(n−1) operations.

What is needed in the art is a method which overcomes the limitations in the art and which is a faster implementation using less operations and whose time is better than proportional to the length of the window.

SUMMARY OF THE INVENTION

The present invention discloses a fast method of implementing sliding-window image processing for associative operators such as MIN, MAX, AND, and OR. For one dimension, the present method divides the image into blocks according to the sliding window size and for each block calculates two sets of partial results, one working from the left boundary of the block and the other working from the right boundary of the block. The partial results from two adjacent blocks can then be combined in one operation to give a final value for any window straddling two adjacent blocks. The total number of operations is proportional to 3M; where M is the scan length as compared to (n−1)M using prior art; where n is the length of the sliding window. The present invention can be extended to two-dimensional arrays and can be extended to support arbitrary window sizes.

DETAILED DESCRIPTION OF THE INVENTION

Often in a hardware or software digital imaging processing system a sliding window is employed across the digital image data and then, for each position of the window, a function of the windowed data is calculated. One example of a function which is often applied to such windowed data is operation of ADDITION. In this case, the value of the sum of a one-position displaced window is incrementally calculated from the sum of the original window by subtracting off the value that just left the sliding window and adding the value that just entered the sliding window. Because addition has an inverse operation, namely, SUBTRACTION, this methodology works well but it does not work at all for operations without an inverse such as MIN, MAX, AND, or OR. Even though these operations do not possess an inverse, the present invention utilizes the fact that these operations have an associative quality, i.e., (x op y) op z=x op (y op z). As such, the present invention provides an efficient method to speed up any operation that is without and inverse operation but is associative.

The present invention discloses a fast method of implementing sliding-window image processing for associative operators such as MIN, MAX, AND, and OR. For one dimension, the present method divides the image into blocks according to the sliding window size and for each block calculates two sets of partial results, one working from the left boundary of the block and the other working from the right boundary of the block. The partial results two adjacent blocks can then be combined in one operation to give a final value for any window straddling two adjacent blocks. Moreover, the present invention can not only be extended to arbitrary window sizes but can also be applied to each dimension independently.

Briefly, the method of the present invention involves the first step of, for a sliding window of size n, the data is first divided into (n+1)-element blocks. Then, for each element in the block starting from the left end of the block the operation is successively applied to the previous result and the next element of the block. Similarly, from the right end of the block the operation is successively applied to the previous result and the next element of the block. At this point, it should be understood that one does not need to calculate the operation across the entire block as this would be across n+1 elements and the sliding window contains only n elements. The next step of the method of the present invention involves the step of for each position of the sliding window determining which block or blocks lie under the sliding window and, if this is a single block, retrieving the value calculated for the elements of the sliding window, or if there are two blocks, combining the previously calculated values in each block corresponding to the part of the sliding window contained in the block. It takes n−1 operations to calculate the left-end results in each block, n−1 operations to calculate the right-end results in each block, and n−1 operations to calculate the n−1 possible overlap positions thereby generating a total of 3*n−3 operations to calculate n+1 windowed results. Note that two of the sliding window positions do not overlap two blocks and no further calculation is necessary in these cases. This averages to less than 3 operations per calculated value.

For example, to calculate a MIN function in a sliding window of length n, an appropriate block size is n+1 because a window of size n always contains an edge of every block it intersects. Then, in each block, calculate and remember successive cumulative minimums from the left edge and then from the right edge. Now, for any position of the sliding window, the minimum in the sliding window can be calculated with at most one more MIN operation. If the sliding window is completely contained in a single block then either the left edge of the sliding window coincides with the left edge of the containing block or the right edge of the sliding window coincides with the right edge of the containing block and the minimum has already been calculated. If the sliding window overlaps two blocks then the minimum in the sliding window can be calculated by taking the minimum of the part of the left block overlapped by the sliding window and the part of the right block overlapped by the sliding window and both of these values have been previously calculated. The total number of operations for this example is (n−1 operations per block for calculations from the left end of the block)+(n−1 operations per block for calculations from the right end of the block)+(n−1 operations to combine results for cases where the sliding window straddles two blocks)+(0 operations in the two cases when the sliding window is contained within a single block)=3n−3 operations to handle n+1 positions of the sliding window or (3n−3)M/(n+1) or about 3M, where M is the scan length, as compared to (n−1)M using prior art; where n is the length of the sliding window.

As an example and not to be considered a limitation in any form, consider the data identified by ABCDEFGHIJK . . . with a sliding window length of 4. If we block by 4+1=5 with a sliding window length of 4 then the calculation proceeds as follows:

ABCDE|FGHIJ|KLMNO|. . . (blocking of the data by 5)

| | |
|---|---|
| AB = op(A,B) | operating from the left end of block 1 |
| ABC = op(AB,C) | |
| ABCD = op(ABC,D) | |
| DE = op(D,E) | operating from the right end of block 1 |
| CDE = op(C,DE) | |
| BCDB = op(B,CDE) | |
| FG = op(F,G) | operating from the left end of block 2 |
| FGH = op(FG,H) | |
| FGHI = op(FGH,I) | |
| IJ = op(I,J) | operating from the right end of block 2 |
| HIJ = op(H,IJ) | |
| GHIJ = op(G,HIJ) | |
| KL = op(K,L) | operating from the left end of block 3 |
| KLM = op(KL,M) | |
| KLMN = op(KLM,N) | | etc. and now calculate the sliding window values as

ABCD—already calculated above

BCDE—already calculated above op(CDE,F)

op(DE,FG)

op(E,FGH)

FGHI—already calculated above

GHIJ—already calculated above op(HIJ,K)

op(IJ,KL)

op(J,KLM)

KLMN—already calculated

LMNO—already calculated etc.

Two-dimensional rectangular windows can be calculated by using the method of the present invention first along rows and storing these results in a two-dimensional array then taking these results and applying the present invention to columns of this array.

Multiple widths of the sliding window can be accommodated by a more complicated combining of the block values. First, the data is blocked into blocks of length n+1 where n is the minimum sliding window length. Then left and right ops are accumulated as well as one covering the entire block. Then the sequence of blocks is divided into meta-blocks each containing n' blocks and the invention disclosed here is applied to these meta-blocks as though they were individual elements. Then the sequence of meta-blocks is divided into meta-meta-blocks each containing n" meta-blocks and the invention disclosed here is applied to these meta-meta-blocks as though they were individual elements. This process of making bigger and bigger meta blocks is continued until the largest length is close to but smaller than the largest sliding window size. The value of the operation applied to the elements of a sliding window can then be calculated by combining values of the contained ((meta-)meta-))blocks using less than log n additional operations where n is the length of the sliding window.

It is envisioned here that an extension of the above disclosed technique is to pre-calculate blocks as above and then to combine multiple blocks for longer windows. It is also an envisioned extension to choose the block length to line up on hardware "word" boundaries as this might be more efficient for some architectures. Both extensions are envisioned herein and should be considered within the scope of the present invention.

In summary, what is disclosed is a fast method of implementing sliding-window image processing for associative operators such as MIN, MAX, AND, and OR. For one dimension, the present method divides the image into blocks according to the window size and for each pixel calculates two partial results, one working left and the other working right. The partial results from the appropriate two positions can then be combined to give a final result for any window position in order to limit the number of operations to 3M; where M is the scan length as compared to (n−1)M; where n is the length of the sliding window. The present invention can be applied to each dimension independently and can be extended to support arbitrary window sizes.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A method of implementing a sliding-window associative operation upon a set of data, the window used in the sliding-window associative operation having a first window dimensional length of m and a second window dimensional length of n, comprising:

(a) dividing the set of image data into a plurality of blocks of data, the blocks of data having a first block dimensional length and a second block dimensional length, the first block dimensional length being greater than m;

(b) executing an associative operation upon each block of data in a first direction and storing the results thereof;

(c) executing the associative operation upon each block of data in a second direction and storing the results thereof, the execution of the associative operation upon each block of data in the first and second directions generating two stored window associative operation values and a plurality of stored partial window associative operation values;

(d) executing a sliding-window associative operation, when the window used in the sliding-window associative operation overlays a portion of a first block of data and a portion of a second block of data, to generate a window associative operation value for the window of data being operated upon, the sliding-window associative operation being executed upon a stored partial window associative operation value associated with the first block of data underlying the window and a stored partial window associative operation value associated with the second block of data underlying the window to generate; and (e) retrieving, when the window used in the sliding-window associative operation overlays only a single block of data, a stored window associative operation value associated with the single block of data, the retrieved window associative operation value being the window associative operation value for the window of data being operated upon.

2. The method as claimed in claim 1, wherein the second block dimensional length is greater than n.

3. The method as claimed in claim 1, wherein the second block dimensional length is equal to n.

4. The method as claimed in claim 1, wherein the blocks of data is blocks of image data.

5. The method as claimed in claim 1, wherein the associative operation is a function to determine a minimum data value within a window of data.

6. The method as claimed in claim 1, wherein the associative operation is a function to determine a maximum data value within a window of data.

7. The method as claimed in claim 1, wherein the associative operation is a function to logically AND all data values within a window of data.

8. The method as claimed in claim 1, wherein the associative operation is a function to logically OR all data values within a window of data.

9. The method as claimed in claim 1, wherein the execution of the associative operation upon each block of data in the first and second directions generating more than two stored window associative operation values and a plurality of stored partial window associative operation values.

10. A method of implementing a sliding-window associative operation upon a set of data, the window used in the sliding-window associative operation having a first window dimensional length of m and a second window dimensional length of n, comprising:

(a) dividing the set of image data into a plurality of blocks of data, the blocks of data having a first block dimensional length and a second block dimensional length, the first block dimensional length being greater than m;

(b) executing an associative operation upon each block of data in a first direction and storing the results thereof;

(c) executing the associative operation upon each block of data in a second direction and storing the results thereof, the execution of the associative operation upon each block of data in the first and second directions generating at least two stored window associative operation values and a plurality of stored partial window associative operation values;

(d) executing a sliding-window associative operation, when the window used in the sliding-window associative operation overlays a portion of a first block of data and a portion of a second block of data, to generate a window associative operation value for the window of data being operated upon, the sliding-window associative operation being executed upon a stored partial window associative operation value associated with the first block of data underlying the window and a single data value associated with the second block of data underlying the window to generate; and (e) retrieving, when the window used in the sliding-window associative operation overlays only a single block of data, a stored window associative operation value associated with the single block of data, the retrieved window associative operation value being the window associative operation value for the window of data being operated upon.

11. The method as claimed in claim 10, wherein the second block dimensional length is greater than n.

12. The method as claimed in claim 10, wherein the second block dimensional length is equal to n.

13. The method as claimed in claim 10, wherein the blocks of data is blocks of image data.

14. The method as claimed in claim 10, wherein the associative operation is a function to determine a minimum data value within a window of data.

15. The method as claimed in claim 10, wherein the associative operation is a function to determine a maximum data value within a window of data.

16. The method as claimed in claim 10, wherein the associative operation is a function to logically AND all data values within a window of data.

17. The method as claimed in clam 10, wherein the associative operation is a function to logically OR all data values within a window of data.

18. The method as claimed in claim 10, wherein the execution of the associative operation upon each block of data in the first and second directions generating more than two stored window associative operation values and a plurality of stored partial window associative operation values.

* * * * *